Patented Feb. 22, 1944

2,342,172

UNITED STATES PATENT OFFICE 2,342,172

METHOD OF OBTAINING POSTERIOR PITUITARY HORMONE

Harry B. van Dyke, Stelton, Bacon F. Chow, Highland Park, and Roy O. Greep, Stelton, N. J., assignors to E. R. Squibb & Sons, New York, N. Y., a corporation of New York No Drawing. Application March 28, 1941, Serial No. 385,686

5 Claims. (Cl. 167—74)

This invention relates to, and has for its object the provision of: the isolated, single hormone of the posterior pituitary having oxytocic, pressor, and diuresis-inhibiting action; and a method of obtaining this hormone.

The posterior pituitary (i. e., the poterior lobe of the pituitary body) has long been known to contain a hormone or hormones having the physiological effects of increasing the blood pressure (pressor action), stimulating uterine contractions (oxytocic action), and affecting renal secretion (diuresis-inhibiting action); and aqueous extracts of the posterior pituitary have been successfully used as remedial agents. The aqueous extract of the posterior pituitary has also been fractionated (U. S. Patent 1,960,493) to obtain one fraction acting primarily on the uterus, and a second fraction producing the characteristic effect of the original solution on the blood vessels, on the intestines, and on urinary secretion. There has been a diversity of opinion, however, as to whether the result of this fractionation is the separation of two distinct hormones or the splitting of a single substance into products having different physiological action.

We have found that the posterior pituitary contains a protein which is a single hormone having the physiological action of both of the aforementioned fractions; and we have isolated this hormone in substantially pure condition, as evidenced by its having the physicochemical properties of a substantially pure protein and by its having constant oxytocic, pressor, and diuresis-inhibiting activity. Manifestly, an aqueous solution of this hormone may be used as a remedial agent wherever aqueous extracts of posterior pituitary are indicated, with the advantages that it is substantially free of inactive material and of other (generally associated) physiologically-active substances, e. g. the melanosome-dispersing hormone (intermedin). Moreover, solutions of this hormone of the desired potency may be readily prepared, i. e. by merely mixing measured quantities of the protein and of the solvent. In other words, we have made available, as a new remedial agent, the substantially pure single hormone of the posterior pituitary having oxytocic, pressor, and diuresis-inhibiting action.

The method of obtaining this hormone essentially comprises: (1) comminuting posterior pituitary, (2) extracting with acidulated water (preferably having a pH of about 3.5 to 5.5), (3) precipitating the hormone from the extract by slightly lowering the pH and raising the salt concentration, (4) removing inorganic salts from the precipitated hormone by dialysis against distilled water, (5) adjusting the pH and salt concentration of the resulting solution to precipitate a black substance therefrom, and (6) precipitating the hormone (protein) from the purified solution by salting it out at a pH near its isoelectric point (4.8). The hormone may be further purified by dissolving it in water and reprecipitating it as in step (6).

The posterior pituitary source material may be obtained from an healthy domesticated animal used for food by man, the pituitary body being removed from the animal immediately after slaughtering and then extracted at once, or kept frozen until extracted. For the extraction step (2), any suitable acid (inter alia, HCl, $H_2SO_4$, and $CH_3COOH$) may be used. The range of pH for the precipitation step (3) may vary considerably, depending, inter alia, on the molarity of the salt added, and the freshness of the pituitary bodies; and the salt concentration may be raised by adding any conventional salting-out salt, inter alia, NaCl, $Na_2SO_4$, $(NH_4)_2SO_4$, and $KH_2PO_4$. For removal of the black substance in step (5), the pH may vary between about 3 and 7, and the fractionation may be effected by means of any conventional salting-out salt, inter alia, chlorides, sulfates, phosphates, nitrates, and citrates. The precipitation step (6) may be effected by many combinations of pH and salt concentrations, a pH near 4.8 being preferred, and any conventional salting-out salt (inter alia, NaCl, $Na_2SO_4$, $(NH_4)_2SO_4$, $KH_2PO_4$, and citrates) being utilizable.

The following example is illustrative of the invention:

Frozen dissected posterior lobes of the pituitary bodies of oxen are ground, and extracted—by stirring for four hours at room temperature—with 9000 cc. of 0.01 N $H_2SO_4$ per 1000 g. of pituitary material (pH of extraction about 4.25). The extract is separated from the residue by centrifugation (or filtration), and the hormone precipitated from the extract by adjusting the pH to about 3.9 and adding NaCl to make an about 1.28 M NaCl solution. The precipitate is collected by centrifugation and dialyzed against distilled water until free from inorganic salts. During dialysis, a relatively insoluble black substance, as well as some hormone, precipitates. The separation of this black substance is effected by adjusting the pH to about 3.5, and adding NaCl to form an about 0.18 M solution. The black precipitate is removed by filtration, and the hormone is precipitated from the clear but slightly-colored filtrate by adding an approximately equal volume of an about 1.0 M acetate buffer (pH about 3.9) and about 6.5 g. solid NaCl per 100 cc. filtrate. The precipitated hormone is further purified by repeating at least once the steps of dissolving the hormone in water and precipitating with acetate buffer and NaCl.

The thus-obtained product is a protein, giving positive tests for protein (inter alia, biuret and xanthoproteic), and being digestible by proteolytic enzymes (e. g. chymotrypsin) with accompanying destruction of physiological activity. It is substantially pure, as evidenced by the following physicochemical tests: in a solvent composed of 0.5 M acetate buffer (pH 3.94) containing 6.5% NaCl, a saturated solution of the protein at 25.3° C. contains 0.10 mg. dissolved N per cc., whether the solution is just saturated or whether 2 mg. protein N per cc. is suspended in the solvent; in the Tiselius electrophoresis apparatus, solutions containing 1% protein at a constant ionic strength of 0.05 act as if they contain one component with traces of impurity; and the protein behaves like a homogeneous substance in the ultra-centrifuge.

The protein is also characterized by the following: its mobility (Tiselius electrophoresis apparatus) at various pH's at 1.5° C. is (pH 3.4) $-6.0 \times 10^{-5}$, (pH 4.1) $-4.2 \times 10^{-5}$
(pH 5.5) $+2.9 \times 10^{-5}$, and (pH 6.1) $+3.8 \times 10^{-5}$ Its isoelectric point (calculated) is pH 4.8–5.0; its constant of sedimentation (ultra-centrifuge) at 6.3° C. ($S^{6.3}$) is $1.87 \times 10^{-13}$; its diffusion constant at 0.3° C. is $4.4 \times 10^{-7}$; its molecular weight (calculated from the diffusion constant and the sedimentation constant, and corrected for the difference in temperature) is 31,000; its f/fo value (dissymmetry factor, indicating shape of protein molecule) is about 1.18; and its elementary analysis is

|  | Per cent |
|---|---|
| C | 48.64 |
| H | 6.63 |
| N | 16.32 |
| Amino N | 0.054 |
| S | 4.89 |
| P | 0.027 |
| Ash | 0.58 |

This protein is a substantially pure hormone having constant oxytocic, pressor, and diuresis-inhibiting activity, as evidenced by tests using the isolated guinea-pig uterus and fowl-blood-pressure for oxytocic activity, the blood-pressure of the dog for pressor activity, and water diuresis in rats for diuresis-inhibiting activity. About 67 micrograms of this protein (about 11 micrograms of nitrogen) is equivalent to 1 unit of the U. S. P. reference standard posterior pituitary hormone (the protein thus having about 7.5 times the potency of the U. S. P. reference standard); and in solutions of the protein (fractions low or high in protein N as a result of electrophoretic migration), the physiological activity does not deviate from the relationship 11 micrograms N $\approx$ 1 U. S. P. unit Also, the physiological activity is associated with the protein when a solution thereof undergoes ultracentrifugation. If the trace of impurity which separates from the hormone in the Tiselius electrophoresis apparatus is mixed with a small amount of the separated hormone and assayed biologically, its activity never exceeds that of the separated hormone. In melanosome-dispersing (intermedin) activity, 11 micrograms N of this protein $\leqq$ 0.002 unit of the U. S. P. reference standard posterior pituitary hormone; hence the protein has about 1/500 or less of the intermedin content (per unit) of the U. S. P. reference standard.

The invention may be variously otherwise embodied, within the scope of the appended claims.

We claim:

1. The method of obtaining the single hormone of the posterior pituitary having oxytocic, pressor, and diuresis-inhibiting action, which comprises extracting comminuted posterior pituitary with acidulated water, precipitating the hormone from the extract by slightly lowering the pH and raising the salt concentration, removing inorganic salts from the precipitated hormone by dialysis, adjusting the pH of the resulting hormone solution to about 3–7, adding a salting-out salt to form a salt solution of a concentration equivalent to an about 0.18 M NaCl solution, removing the black precipitate, and precipitating the hormone from the purified solution by salting it out at a pH near its isoelectric point.

2. The method of obtaining the single hormone of the posterior pituitary having oxytocic, pressor, and diuresis-inhibiting action, which comprises extracting comminuted posterior pituitary with acidulated water at a pH of about 4.25, precipitating the hormone from the extract by lowering the pH and raising the salt concentration, removing inorganic salts from the precipitated hormone by dialysis, adjusting the pH of the resulting hormone solution to about 3–7, adding a salting-out salt to form a salt solution of a concentration equivalent to an about 0.18 M NaCl solution, removing the black precipitate, and precipitating the hormone from the purified solution by salting it out at a pH near its isoelectric point.

3. The method of obtaining the single hormone of the posterior pituitary having oxytocic, pressor, and diuresis-inhibiting action, which comprises extracting comminuted posterior pituitary with acidulated water, precipitating the hormone from the extract by adjusting the pH to about 3.9 and adding a salting-out salt to form a salt solution of a concentration equivalent to an about 1.28 M NaCl solution, removing inorganic salts from the precipitated hormone by dialysis, adjusting the pH of the resulting hormone solution to about 3–7, adding a salting-out salt to form a salt solution of a concentration equivalent to an about 0.18 M NaCl solution, removing the black precipitate, and precipitating the hormone from the purified solution by salting it out at a pH near its isoelectric point.

4. The method of obtaining the single hormone of the posterior pituitary having oxytocic, pressor, and diuresis-inhibiting action, which comprises extracting comminuted posterior pituitary with acidulated water, precipitating the hormone from the extract by slightly lowering the pH and raising the salt concentration, removing inorganic salts from the precipitated hormone by dialysis, adjusting the pH of the resulting hormone solution to about 3.5, and adding NaCl to form an about 0.18 M NaCl solution, removing the black precipitate, and precipitating the hormone from the purified solution by salting it out at a pH near its isoelectric point.

5. The method of obtaining the single hormone of the posterior pituitary having oxytocic, pressor, and diuresis-inhibiting action, which comprises extracting comminuted posterior pituitary with acidulated water, precipitating the hormone from the extract by slightly lowering the pH and raising the salt concentration, removing inorganic salts from the precipitated hormone by dialysis, adjusting the pH of the resulting hormone solution to about 3-7, adding a salting-out salt to form a salt solution of a concentration equivalent to an about 0.18 M NaCl solution, removing the black precipitate, and precipitating the hormone from the purified solution by adding an approximately equal volume of about 1.0 M acetate buffer and about 6.5 g. solid NaCl per 100 cc. of the solution.

HARRY B. VAN DYKE.
BACON F. CHOW.
ROY O. GREEP.